United States Patent [19]
Sukup

[11] 3,966,124
[45] June 29, 1976

[54] SPREADER FOR GRAIN AND LIKE MATERIAL

[76] Inventor: Eugene G. Sukup, Dougherty, Iowa 50433

[22] Filed: June 16, 1975

[21] Appl. No.: 587,056

Related U.S. Application Data

[62] Division of Ser. No. 452,736, March 20, 1974, Pat. No. 3,902,610.

[52] U.S. Cl. .............................. 239/666; 239/687; 214/17 CB
[51] Int. Cl.² .................. A01C 17/00; B65G 65/32
[58] Field of Search ........... 239/650, 665, 666, 681, 239/687; 214/17 CB, 17 C, 22, 18.38; 222/168

[56] References Cited
UNITED STATES PATENTS

| | | | |
|---|---|---|---|
| 1,839,597 | 1/1932 | Ryba | 239/665 |
| 2,587,678 | 3/1952 | Aasland et al. | 239/666 |
| 2,980,009 | 4/1961 | Donelson | 239/687 X |
| 3,064,833 | 11/1962 | Von Ruden | 214/17 CB |
| 3,171,658 | 3/1965 | Clark | 239/666 |
| 3,279,801 | 10/1966 | Meyer | 239/687 |
| 3,282,591 | 11/1966 | Donelson | 239/665 |
| 3,488,007 | 1/1970 | Neuenschwander | 239/687 |
| 3,563,476 | 2/1971 | Donelson | 239/687 X |
| 3,682,394 | 8/1972 | Shivvers | 239/665 |
| 3,791,592 | 2/1974 | Cobb | 239/687 X |

Primary Examiner—Robert S. Ward, Jr.
Attorney, Agent, or Firm—Neuman, Williams, Anderson & Olson

[57] ABSTRACT

A grain spreader is provided with a plurality of rigid mounting arms each of which is supported in a pivotal manner at the periphery of a bin top opening and at the spreader body, with each arm extending to the main spreader body along a chord of the opening, for ready adjustability to openings of different effective diameters. The thrower plate is pivotally supported on a link which is joined to a hollow rotatable vertical shaft and on a coaxial vertical rod which extends upward through the shaft. The rod is adjusted axially of the shaft for changing the angle of the thrower plate relative to the horizontal, and the shaft, rod, link and thrower are rotatable as a unit in any position of relative adjustment. A distributor plate mounted on the upper end of the rod and shaft is provided with radial vanes for distributing the grain within the receiving guide to maintain even flow.

4 Claims, 4 Drawing Figures

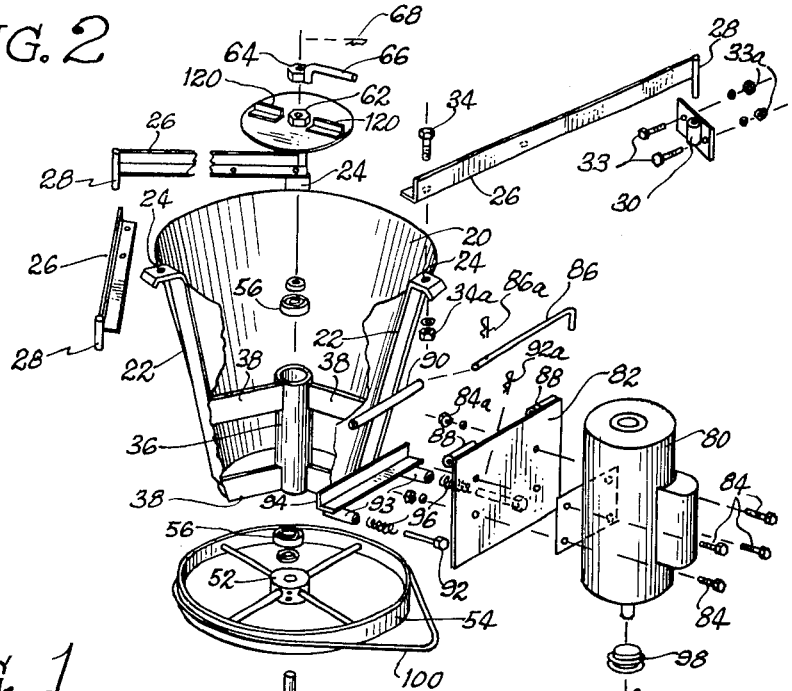
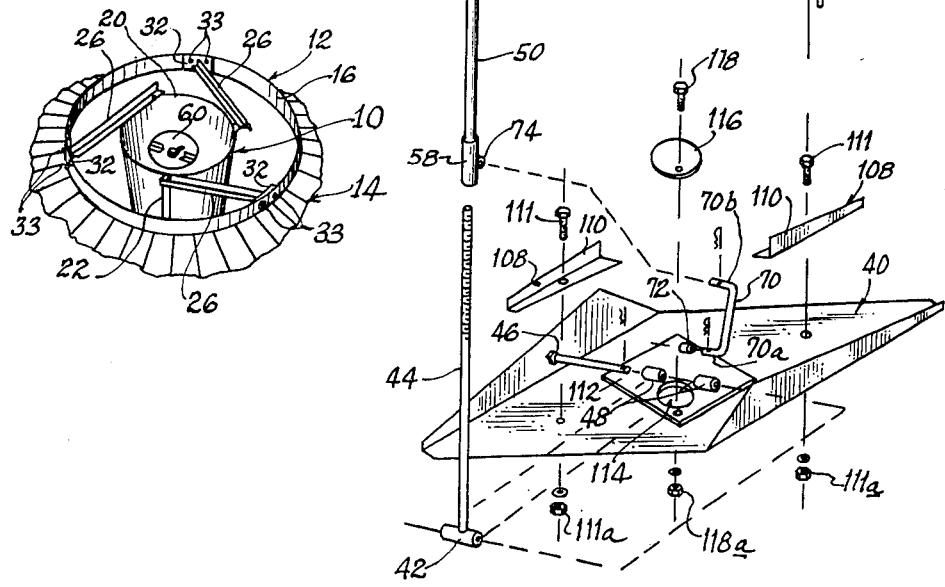

SPREADER FOR GRAIN AND LIKE MATERIAL

This is a division of copending application Ser. No. 452,736, filed Mar. 20, 1974 and now U.S. Pat. No. 3,902,610, issued Sept. 2, 1975.

This invention relates to improvements in distributors such as are positioned beneath a top filler opening of a grain storage bin for effecting distribution within the bin of grain or similar particulate material which is recieved through the filler opening. More particularly, this invention relates to improved hanger or mounting arrangements for such distributors, improved adjustable mountings for the thrower blade, and improved preliminary distribution of the material within the main distributor body prior to the engagement of the material on the main thrower blade.

Distributors or spreaders of a wide variety of designs, manners of operation and mounting arrangements previously have been proposed. Basically, such units usually include a receiving hopper or guide which often is of a truncated conical shape with its larger end open upward for receiving the particulate material from a conveyor, elevator or the like. A rotatable flinger or thrower of a fan, plate or open ended pan configuration usually is positioned beneath the lower outlet end of the guide, and means are provided for rotating this thrower for spreading or distributing the material over the cross-sectional area of the storage structure in which the spreader is mounted. Various devices of this general type are illustrated in a number of United States patents, including the following:

| Patent No. | Inventor |
| --- | --- |
| Re. 25,862 | Donelson |
| 2,955,828 | Kinsella |
| 3,001,465 | Donelson |
| 3,045,840 | Donelson |
| 3,064,833 | Von Ruden |
| 3,248,117 | Donelson |
| 3,282,591 | Donelson |
| 3,315,823 | Rikoff |
| 3,469,718 | Felix et al. |
| 3,488,007 | Neuenschwander |
| 3,682,394 | Schivvers |

It is an object of this invention to provide improved spreader apparatus for spreading or distributing grain or like materials in storage bins.

It is a further object of this invention to provide an improved mounting arrangement for grain spreaders and more particularly to provide a mounting arrangement which uses standard components and which is conveniently adapted to mounting the spreaders in bin openings of various sizes.

It is a further object of this invention to provide an improved mounting for a thrower element, which affords positive positioning and convenient adjustment of the thrower plate.

Further and additional objects and advantages will appear from the description, the accompanying drawings and appended claims.

In carrying out this invention in one illustrative form, a grain spreader is provided including a receiving guide and spreader assembly to be disposed generally vertically, beneath the center top opening of a typical grain storge bin. A hollow shaft is rotatably journaled within the guide and extends therebelow, and a support rod extends through this hollow shaft. A generally planar thrower plate is pivotally attached to the rod, beneath the shaft, for receiving grain dropped from the guide. A link element is pivotally attached to the shaft and pivotally attached to the plate at a location spaced from the pivotal attachment between the plate and the rod. Means are provided for selectively adjusting the rod axially of the shaft, whereby the angular position of the thrower plate relative to horizontal is adjusted by such adjustment of the rod. Power means is provided for rotating the assembly of the rod, shaft, link and plate for distributing the grain in the storage structure.

The support system for mounting the spreader includes rigid support arms of predetermined lengths positioned around the guide body, with each arm extending from the main spreader assembly to the periphery of the opening generally parallel to the plane of the opening. Means are provided for pivotally securing opposite ends of the arms to the spreader assembly and to the storage structure at the periphery of the mounting opening. The means at at least one end of each arm provides pivotal cantilever support for that arm, thereby permitting pivotal movement of the arms while maintaining the arms generally parallel to the plane of the mounting opening. Accordingly, the arms are adjustble about these pivotal supports to extend along appropriate chords of a mounting opening to thereby accommodate the mounting system using arms of fixed predetermined lengths to openings of various effective diameters.

A distributor plate is mounted on the upper end of the shaft within said guide, for rotation with the shaft. The plate is of a lesser diameter than the guide therearound and is provided with upstanding radial vanes on its upper surface, whereby grain received in the guide is distributed outward along the inner surface of the guide by the distributor plate and vanes, prior to dropping of the grain out of the guide and onto the thrower plate.

For a more complete understanding of this invention, reference should now be had to the embodiment illustrated in greater detail in the accompanying drawings and described below by way of an example of the invention.

In the drawings,

FIG. 1 is a partial perspective view of the top opening section of a conventional grain storage bin with a grain spreader employing teachings of this invention supported therein;

FIG. 2 is an exploded view of the grain spreader of FIG. 1;

Figure 3:
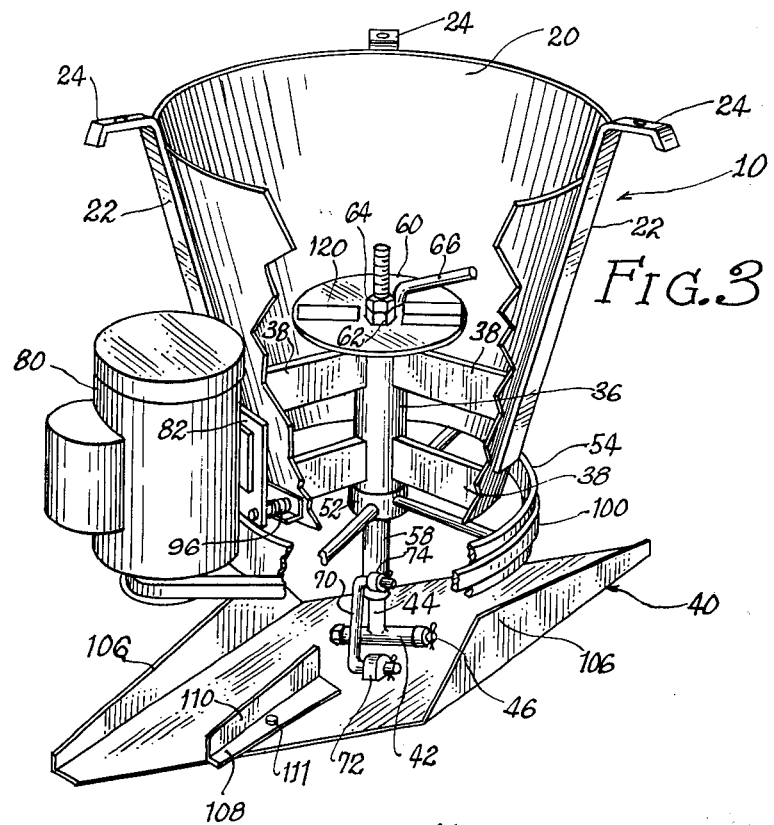
FIG. 3 is a perspective view, partially broken away, of the grain spreader of FIGS. 1 and 2.

Referring now to the drawings, a grain spreader 10 is shown mounted within or directly beneath the top circular opening 12 of a common type of grain storage bin. Such a bin typically is fabricated of sheet metal and has right-circular cylindrical wall (not shown) and a conical roof 14, with the opening 12 at the central peak of the roof. A circular flange, band or other support structure 16 typically defines this center opening. Normally, grain or other material to be stored in the bin is fed in through this center top opening and is distributed over the cross sectional area of the bin by the spreader.

The spreader 10 includes a truncated conical guide 20 which is vertically oriented generally in alignment with the center of the opening 12 for receiving the material being deposited in the bin. The guide 20 is supported beneath the roof opening 12, with its large end opened upward, and in turn supports the other related mechanism of the spreader. Three support straps 22 are attached to the outer surface of the guide 20, with each strap including a laterally-extending flat upper horizontal end portion 24, as shown.

Three rigid support arms 26 are provided for supporting the spreader 10. Each of these arms, which may be angle irons as illustrated, is of a predetermined length and is provided with a pivot pin 28 rigidly attached at its outer end as by welding. The pins 28 extend downward, normal to the length of the respective arms, and each is received in a mating hollow cylindrical sleeve 30 affixed to an attachment plate 32. The three plates 32 are affixed to the inner surface of the flange 16, as by bolts 33 and nuts 33a, at equally spaced positions around the perimeter of the opening 12 and with the axes of the sleeves 30 vertical. Thereby the arms 26 are supported in cantilever fashion by the pins 28 and the sleeves 30 for supporting a vertical load, and are pivotal about the axes of the pins 28 and sleeves 30 for movement in a plane generally parallel to the plane of opening 12. The inner end of each arm 26 is attached to one of the upper bracket portions 24 by a bolt 34 and nut 34a, with the horizontal lower surface of the lower flange against the upper flat surface of the respective bracket portion as shown. These inner end attachments provide further cantilever type support action. As seen in FIG. 1, each arm 26 extends from the respective bracket 32 to the respective support bracket portion 24 along the appropriate chord of the circle defined by the three brackets 32.

The disposition and manner of mounting of the support arms 26 permits mounting of a spreader 10 with support arms 26 of a standard length within openings 12 of widely varying sizes. The unit is readily adapted to varying sizes of openings and thus various spacings of the support plates 32 by the simple expedient of adjusting the angular positions of the arms relative to the radii from the center of the conical guide 20, by pivoting action about the respective pins 28 and bolts 34. For instance, in the position shown in FIG. 1, the arms 26 are positioned for mounting the spreader 10 in a relatively small opening 12. In this position, the arms 26 extend along chords of the circle of sleeves 30 which are approximately tangential to the outer periphery of the guide 20. As the arms are moved to positions more closely parallel to radii from the center of the conical guide 20, the mounting assembly is automatically adapted to mounting in openings 12 of larger diameters.

Figure 4:
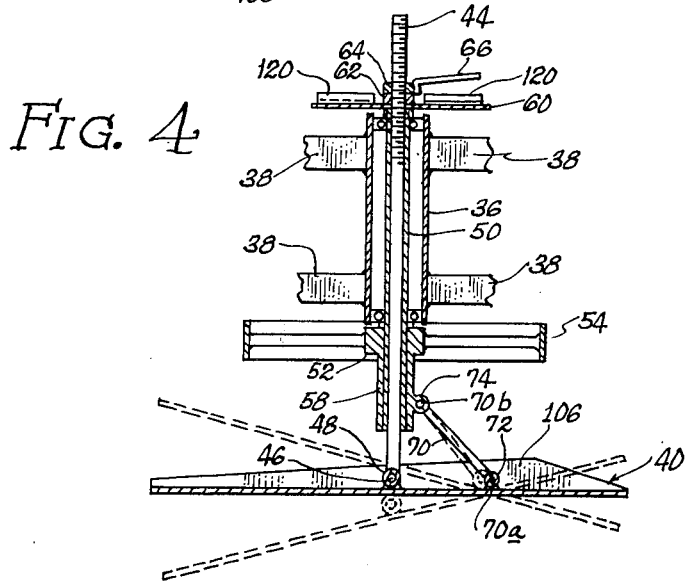
FIG. 4 is an enlarged partial center section view of the grain spreader of FIG. 1.

Referring now further to FIGS. 2–4, a vertical center support tube 36 is mounted on a plurality of radial struts 38, which are secured within the lower portion of the guide 20. The spreader mechanism comprises a blade or fan 40 which is pivotally mounted on the hollow horizontal lower end section 42 of a T-bolt support 44. To this end, a pivot pin 46 extends through a pair of spaced collars 48 attached to the fan member and through the section 42 to permit pivoting of the spreader blade 40 about a generally horizontal axis corresponding to the center axis of section 42. The shank of T-bolt 44 extends upward through a hollow cylindrical shaft 50 which in turn extends through the hub 52 of a drive pulley 54 and through the support tube 36. Bearings 56 are supported in the upper and lower ends of tube 36 and journal the hollow shaft 50 for rotation within the tube. The hub 52 has a spline, key or press fit rotary drive engagement with the shaft 50 above an enlarged support sleeve section 58 of the shaft for rotating the shaft and related mechanism as will be referred to further below. Shaft 50 is supported vertically by a press fit or axial locking engagement with the inner races of the bearings 56. A distributor disc 60 is attached to a nut 62 which is threaded onto the upper end of bolt 44 for vertically adjustably supporting the bolt 44 on the shaft 50. A second nut 64 also is threaded on bolt 44, and is provided with a handle 66 to provide a jamb locking engagement of the nut 62 at any predetermined vertical adjustment position of the bolt 44. A spring pin 68 extends through shaft 44 as a safety lock.

A C-shaped link pin 70 has its lower leg 70a pivotally engaged in a collar 72 which is parallel to collars 48 and attached to the spreader blade 40. Collar 72 is spaced longitudinally of blade 40 from the collars 48, as illustrated. The upper parallel leg 70b of the link is pivotally engaged in a collar 74 attached to the sleeve 58 which is affixed to the shaft 50 below and in abutting engagement with the hub 52. Collar 74 also is parallel to collars 48, and thus to collar 72.

Vertical adjustment of the bolt 44 relative to shaft 50 will cause a concomitant change in the vertical position of pivot pin 46 relative to collar 74 and leg 70b therein. Due to the spaced pivotal support connections at pin 46 and at legs 70a and 70b, such adjustment of rod 44 causes a correlated change in the angular position of the blade 40 by relative adjustment of that blade about the pivotal supports at 46, 70a and 70b, such as is illustrated schematically in FIG. 4. Selective vertical adjustment of bolt 44 relative to the shaft 50 is obtained by loosening the lock nut 64, then rotating the distributor plate 60, thereby threading nut 62 along bolt 44 and raising or lowering the bolt 44 relative to the other elements. At the desired angular position of the blade 40, the lock nut 64 is tightened to maintain the vertical adjustment. The angle of the blade 40 to the horizontal thus may be adjusted to obtain a desired spreading pattern of the particulate material within the storage bin.

The entire assembly comprising the spreader plate 40, bolt 44, shaft 50, distributor plate 60 and link element 70 is rotated as a unit by the pulley 54 during spreading operation. The drive system comprises an electric motor 80 which is attached to a mounting plate 82 by bolts 84a. A horizontal pivot pin 86 engages spaced sleeves 88 on the plate 82 and a complementary sleeve 90 which is affixed to one of the brackets 22, thereby pivotally supporting the motor 80 on the guide unit 20. At its lower edge, the plate 82 abuts the heads of pins 92 which slidably engage in sleeves 93 on a support bracket 94 which also is attached to the bracket 22. Compression springs 96 urge the bolts 92 outward, about the axis of pin 86, to maintain the motor pulley 98 in engagement with a drive belt 100 which extends about the pulley 98 and the pulley 54. Retainer pins 86a and 92a are provided for the respective pins 86 and 92.

The spreader blade 40 may be of any appropriate configuration. In the embodiment illustrated, the spreader 40 is generally of a non-rectilinear parallelogram configuration, having upstanding flanges 106 along its sides. Angular guide vanes 108 having upstanding flanges 110 are positioned at each end and attached by bolts 111 and nuts 111a, with the flanges 110 generally parallel with the sides 106 and tapering outwardly. A reinforcing plate 112 is included in the area of attachment of the mounting sleeves 48 and 72. A center opening 114 is provided to permit part of the grain to drop straight downward, into the area beneath the spreader. A cover plate 116 is shown with an attachment bolt 118 and nut 118a for selectively closing this opening 112.

As is best seen in FIGS. 1 and 3, the rotary distributor plate 60 is of a lesser diameter than the guide 20 therearound, to provide an annular passage for downward movement of grain or other material dropped into the guide 20 from above. Upstanding radial vanes 120 are provided on the upper surface of the plate 60 for spreading the grain outward within the spreader guide 20, against the inside surfaces of the guide to maintain even flow downward to the spreader plate 40. This assists in obtaining a uniform distribution pattern in the bin with the spreader unit 10.

The overall operation of the spreader 10 will be apparent. In summary, as grain or like particulate material is dropped into the upper end of the guide 20, the material first encounters the distributor disc 60. Since the disc and the vanes 120 are being rotated, the material is distributed around the periphery of the conical guide 20, and then drops through the open lower end onto the spreader blade 40 for distribution across the storage area in the bin space below the spreader unit. The angle of the blade 40 is adjusted as described above to the appropriate angle for obtaining uniform distribution in accordance with the radius of the storage space, the rate of rotation of the spreader blade, and nature of the material being received and spread, and other operating parameters.

It will be seen that a spreader assembly has been provided which meets thr aforestated objects.

While a particular embodiment of this invention has been shown, it will be understood, of course, that the invention is not limited thereto since modifications may be made by those skilled in the art, particularly in light of the foregoing teachings. Therefore, it is contemplated by the appended claims to cover any such modifications as incorporate those features which may be said to constitute the essential features of these improvements within the true spirit and scope of the invention.

What is claimed is:

1. A spreader assembly for spreading grain or like material comprising a material receiving guide to be disposed generally vertically, a first support rotatably supported in said guide and extending therebelow, a second support extending parallel to said first support and being adjustable in a direction parallel to the axis of rotation of said first support and rotatable with said first support, a thrower member disposed beneath said guide for receiving thereon such material dropped from said guide, said thrower member being pivotally supported on said second support for axial movement therewith as said second support is adjusted axially of said first support, a link element mounted pivotally on said first support and pivotally attached to said thrower member at a location spaced from the pivotal connection of said thrower member to said second support, means for selectively adjusting the postition of said second support axially of said first support, whereby the angular position of said thrower member relative to horizontal is determined by such axial adjustment of said second support, and means for rotating said first and second supports, said link and said thrower member for distributing material received through said guide in any adjusted position of said thrower member.

2. A grain distributor assembly as in claim 1 wherein said link element is a rigid link having parallel end legs pivotally joined to said thrower member and to said first support, and said thrower member being attached to said second support for pivotal movement about an axis parallel to said end legs.

3. A spreader assembly for spreading grain or like material comprising a material receiving guide to be disposed generally vertically, a hollow shaft rotatably supportd in said guide and extending therebelow, a support rod extending through said hollow shaft and being movable axially thereof and rotatable therewith, a thrower plate mounted pivotally on said rod beneath said shaft for receiving thereon such material dropped from said guide, a link element depending pivotally from said shaft and pivotally attached to said plate at a location spaced from the pivotal mount of said plate on said rod, means for selectively adjusting the position of said rod axially of said shaft, whereby the angular position of said thrower plate relative to horizontal is adjusted by such adjustment of said rod, and means for rotating said shaft, said rod, said link and said thrower plate for distributing such material received through said guide in any such adjusted position of said thrower plate.

4. A grain spreader assembly comprising a truncated conical guide to be disposed generally vertically, a drive shaft rotatably supported in said guide, and extending coaxial therewith, a thrower plate mounted on said shaft beneath said guide and rotatable with said shaft for distributing grain received from said guide, a distributor plate mounted on said shaft within said guide for rotation with said shaft, said distributor plate being of lesser diameter than said guide therearound, and upstanding radial vanes on the upper surface of said distributor plate, whereby grain received by said guide is dispersed outward about the inner surface of said guide by said distributor plate and vanes thereon prior to dropping to said thrower plate.

* * * * *